Figures 1A, 1B:
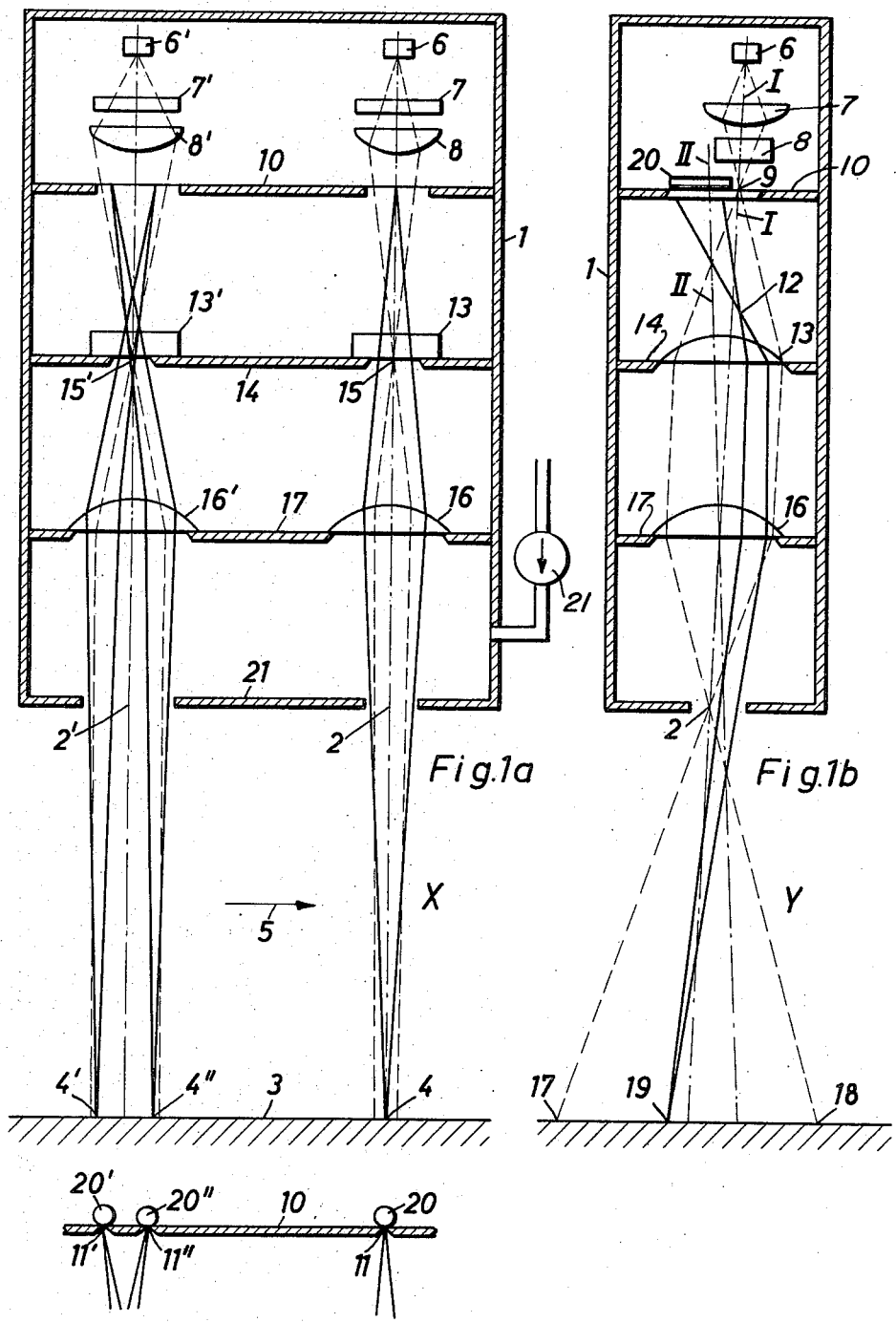

United States Patent [19]
Andermo

[11] 3,865,487
[45] Feb. 11, 1975

[54] OPTICAL VELOCITY METER PICK-UP HEAD

[75] Inventor: Nils Ingvar Andermo, Enbyberg, Sweden

[73] Assignee: Hasler AG., Bern, Switzerland

[22] Filed: Apr. 3, 1973

[21] Appl. No.: 347,428

[30] Foreign Application Priority Data
Apr. 6, 1972 Switzerland.......................... 4944/72

[52] U.S. Cl..................... 356/28, 324/175, 250/216
[51] Int. Cl. ............................................ G01p 3/36
[58] Field of Search ........ 356/28; 324/175; 250/216

[56] References Cited
UNITED STATES PATENTS

| | | | |
|---|---|---|---|
| 3,344,700 | 10/1967 | Brake................................. | 356/169 |
| 3,508,066 | 4/1970 | Agar ..................................... | 356/28 |
| 3,525,569 | 8/1970 | Gamertsfelder et al. ............. | 356/28 |
| 3,689,157 | 9/1972 | Andermo.............................. | 356/28 |

Primary Examiner—Maynard R. Wilbur
Assistant Examiner—S. C. Buczinski
Attorney, Agent, or Firm—Brady, O'Boyle and Gates

[57] ABSTRACT

A pick-up head for an optical velocity meter connected to a vehicle to measure the velocity thereof has a pair of light-sources spaced in the direction of travel and an optical system to illuminate two points on a stationary surface along which the vehicle moves. Reflected light from the two points illuminated by the pick-up head are received by two photoelectric convertors, spaced in the direction of travel in the pick-up head, through the same optical system formed such that the points in the direction of travel are sharply defined and narrow in comparison to the distance between them, but not sharply defined and broad in relation to their size transverse to the direction of travel, to produce corresponding voltage signals separated in relation to one another by the time which is required for covering the distance between two points and the velocity is determined by correlation of the two voltages.

7 Claims, 2 Drawing Figures

PATENTED FEB 1 1 1975

3,865,487

OPTICAL VELOCITY METER PICK-UP HEAD

The invention relates to a pick-up head applied to a rail vehicle for an optical velocity meter for measurement of the velocity of the vehicle by means of correlating the voltages which are emitted from two photoelectric convertors which receive reflected light from two points on a stationary irregular surface along which the vehicle moves. Such correlation velocity meters are known. The light reflected from the points is picked up by two photoelectric convertors and produces two electrical voltage signals which have the character of a noise potential. Both signals have the same time function but one is delayed in relation to one another by the time which is required for covering the distance between the two points at the velocity in question. The voltage received from the leading point is delayed such that the integrated product of the instantaneous value of the two voltages becomes a maximum (correlation). The relative velocity between the pick-up head and the surface opposite to it is given by means of the time lag thus determined and the distance between the two points.

A pick-up head is described in U.S. Pat. No. 3,799,671. In this the optical system produces two small points of light, sharply defined on all sides, on the rail. However, experience has shown that railway rails have highly reflective surfaces such that merely an inadequate quantity of light is reflected into the objective if the straight illuminated surface element does not reflect in the direction of the receiving optical system. In addition there is the danger with rail vehicles that the motion of the vehicle is not in a perfectly straight line so that there is poor coverage of the two rays picked up by the convertors on the surface.

One object of the present invention is to constitute an optical system for a pick-up head in which a sufficient quantity of light is reflected back into the objective even when the reflecting surface of the rail does not lie perpendicular to the illuminating beam, and in which the effect of a movement of the vehicle transversely to the direction of travel remains slight on the signals picked up. This is obtained in accordance with the invention in that the optical system, which directs light from the two points to two respective photoelectric convertors, is so formed that the points are sharply defined in the direction of travel and narrow in relation to their separation but are however broad in relation to their size in the direction of travel and not sharply defined transversely to the direction of travel.

In the following the invention is explained from examples on the basis of the drawings. These show in FIG. 1a a section of a pick-up head in the plane of direction of travel and perpendicular to the reflecting surface (X-plane, Section I—I);

FIG. 1b a section of the pick-up head in the plane transverse to the direction of travel and perpendicular to the reflecting surface (Y-plane);

FIG. 2 a part of a section in the X-plane, displaced parallel to FIG. 1 (Section II—II in FIG. 1b).

In the following it is assumed that the reflecting plane lies horizontally, then the X and Y-planes are vertical; however other positions are obviously possible.

In FIG. 1a one of the two directions of travel is indicated by an arrow 5. 1 is the casing, closed on all sides, which is attached to the vehicle and has only two apertures 2 and two on its underside which face the surface of the rail 3. The pick-up head contains 2 optical systems; the left-hand system illuminates two points 4' and 4" lying one behind the other in the direction of travel, while the right-hand system only illuminates one point 4. Comparison of the reflected light can be made either from both the points 4' and 4" illuminated by the left-hand system or between one point, e.g. 4', illuminated by the left-hand system and the point 4 illuminated by the right-hand system. With this the first comparison gives a less accurate measurement than the second, but this makes an approximate measurement easier. However a complete measuring head can only consist of a system of the kind shown in FIG. 1a on the left or of two systems of the kind shown on the right, whereby such a system takes the place of the one shown on the left. First the system shown on the right in FIG. 1a will be described. 6 indicates a light-source, 7 and 8 a condenser system consisting of transposed cylindrical lenses. 13 is a cylindrical lens, 14 a shutter with an elongated aperture 15, 16 is a spherical lens.

This optical system produces the illumination in the following manner: In the vertical plane in the direction of travel (X-plane) the cylindrical lens 8 reproduces the light-source 6 on the plane of the shutter 14. The beams of the light-source passing through the shutter 14 are made approximately parallel by the lens 16 and pass through an aperture 2. In the vertical plane transverse to the direction of travel (Y-plane) the cylindrical lens 7 of the condenser focusses the light-source 6 onto the point 9 of the diaphragm plane 10. This first image of the light-source is focussed by the cylindrical lens 13 and the spherical lens 16 onto the plane of the aperture 2. The light passing through this forms a divergent pencil which strikes the rail surface 3 and illuminates it. The limits of the illuminating beams are drawn in FIGS. 1a and 1b in dotted lines and intercept the surface of the rail at 17 and 18.

The same lens-system serves to reproduce the point 4 on the rail surface 3 on a slit diaphragm 11 disposed in the plane 10 before the photoelectric converter 20. In the X-plane the rail surface is reproduced on the diaphragm plane 10. However in the Y-plane a point 19 of the rail surface 3 is reproduced on a point 12 lying between the planes 10 and 14. Thus in the diaphragm plane 10 the image of any point of the rail surface 3 appears spread into a narrow line. The slit diaphragm is disposed in the direction of the said line. Thus in the direction 5 of travel the zone on the surface 3 of the rail from which light can pass through the slit diaphragm 11 is narrow and sharply defined, but transversely to the direction 5 of travel it is broad and not sharply defined. Thus it is not necessary for the illuminated zone in the longitudinal extension to cover the complete zone reflected onto the converter slit diaphragm 11 whereas this is necessary in the transverse direction. Small movements of the pick-up head transversely to the direction 5 of travel during forward motion only cause slight modifications in the signal. Even if the rail is curved transversely to the direction of travel, it is highly probable that will be reflected from at least one of the points lying between 17 and 18 and pass through the shutter aperture 2 and thus to the photoelectric convertor 20 as well.

In the left-hand system the arrangement is the same with the difference that the spot of light is broader in the direction 5 of travel and in that two slit diaphragms 11' and 11" and behind them two photoelectric converters 20' and 20'' are provided in the diaphragm plane 10 so that with this system two points 4' and 4'', which are narrow and lie one after the other in the direction of travel, are sensed.

To avoid fouling it is desirable to keep the aperture 2 as small as possible. Diminution of the aperture is possible when the associated optical system is only serving to sense one point on the reflecting surface. In the illuminating and in the light-receiving systems the quantity of light decreases linearly with the diameter of the aperture 2 when the image in the light source or the light-sensitive aperture of the photoelectric convertor in the Y-plane transversely to the direction of travel in the plane of aperture 2 is smaller than the aperture 2.

To avoid the entry of dust and moisture through the apertures 2 and 2', a blower 21, force air feed device, or the like, is connected to feed air into casing 1 during motion relative to the rails to produce a stream of air directed outwardly through these apertures from the inside to the outside of the casing.

What we claim is:

1. In a pick-up head disposed on a rail vehicle for optical measurement of the velocity of the vehicle in relation to a stationary surface (3) adjacent to it and along which the vehicle moves (5), having means (6, 7, 8, 13, 16, 6', 7', 8', 13', 16') for illuminating a portion of said stationary surface (3);

two photoelectric converters (20, 20') spaced apart in the direction (5) of movement of the vehicle;

two slit diaphragms (11, 11') arranged in a common plane (10) parallel to said stationary surface (3) each in front of one of said photoelectric converters (20, 20') and extending perpendicularly to the direction (5) of movement of the vehicle;

optical means (13, 16, 13', 16') for projecting an image of said stationary surface (3) onto the plane (10) of said slit diaphragms (11, 11') so that each of said photoelectric converters (20, 20') receives light from one of two elongated surface increments (4, 4') forming parts of said illuminated portion of said stationary surface (3) and spaced apart in and extending perpendicularly to the direction (5) of movement of the vehicle and fixed in relation to the pick-up head, whereby signals delivered by said photoelectric converters (20,20') are utilized for determining the velocity of the vehicle by correlation;

the improvement comprising said optical means (13, 13', 16, 16') containing means (13, 13') for spreading the image of any point of the surface increments into a line in the plane (10) of said slit diaphragms (11, 11') and in the direction of the slits (11, 11', 11'') thereof so that the photoelectric converters (20,20') receive less light from the ends and more light from the middle of said surface increments.

2. A pick-up head as set forth in claim 1, wherein said means for spreading comprise cylindrical lens means (13, 13') having its axis in the direction (5) of movement of the vehicle.

3. A pick-up head as set forth in claim 1, wherein said means for illuminating said portion of said stationary surface (3) comprise light beam producing means (6, 6', 7, 7' 8, 8') comprising condenser means (7, 8, 7', 8') having different focal lengths in two longitudinal beam sections perpendicular to one another, so that each light beam is focused in a longitudinal beam section (Y) transverse to the direction (5) of movement of the vehicle into a line (9) in the plane (10) of the slit diaphragms (11, 11') near to one end thereof and perpendicular thereto, and each light beam is focused in a longitudinal beam section (X) parallel to the direction (5) of movement of the vehicle into a line (15, 15') in a plane (14) between said plane (10) of said slit diaphragms (11, 11') and said stationary surface (3).

4. A pick-up head as set forth in claim 1, in which said means for illuminating comprises two light sources (6, 6'), each of said light sources provided with condenser means (7, 8, 7', 8') having different focal length in two longitudinal light beam sections perpendicular to one another, so that each light beam is focused in a longitudinal beam section (Y) transverse to the direction (5) of movement of the vehicle into one of two lines (9) in the plane (10) of said slit diaphragms (11, 11', 11'') each near to one end of said slit diaphragms, and perpendicular to the slit, and each light beam is focussed in a longitudinal light beam section (X) parallel to the direction (5) of movement of the vehicle into one of two lines (15, 15') in a plane (14) between said plane (10) of said slit diaphragms (11, 11', 11'') and said stationary surface (3).

5. A pick-up head as set forth in claim 4, including a third photoelectric converter (20'') and a third slit diaphragm (11'') in the plane (10) of said two slit diaphragms (11, 11') parallel to the slits thereof and having different distances therefrom and receiving light from a third elongated surface increment (4'') spaced from and extending parallel to said two surface increments (4, 4') and forming a further part of said illuminated stationary surface (3), whereby the signals delivered from a pair of photoelectric converters selected from said two and said third photoelectric converters (20, 20', 20'') are utilized for determining the velocity of the vehicle by correlation.

6. A pick-up head as set forth in claim 3, wherein said means (6, 6', 7, 7', 8, 8') for illuminating said portion of said stationary surface (3), said optical means (13, 16, 13', 16'), said photoelectric converters (20, 20') and said slit apertures (11, 11') are housed in a closed casing (1) provided with apertures means (2) in the wall (21) of said casing (1) facing said stationary surface (3), said optical means (13, 16, 13', 16') projecting the plane (10) of said slit diaphragms (11, 11') onto the plane (21) of said aperture means (2) in said wall (21) of said housing (1) in a beam section (Y) perpendicular to the direction (5) of movement of the vehicle.

7. A pick-up head as set forth in claim 6 including means connected to said closed casing to produce a constant steam of air outwards through said apertures (2) in said wall of said housing.

* * * * *